Patented Nov. 26, 1946

2,411,826

UNITED STATES PATENT OFFICE 2,411,826

HALOACETALS

Edward M. Filachione, Philadelphia, Pa., assignor to Monsanto Chemical Company, St. Louis, Mo., a corporation of Delaware No Drawing. Application September 27, 1943, Serial No. 504,061

16 Claims. (Cl. 260—615)

This invention relates to the preparation of halo acetals such as the acetals of haloaldehydes. In accordance with the present invention, I have been able to prepare halo-acetals by treatment of vinyl acetate with halogen such as chlorine or bromine in the presence of an alcohol, particularly an aliphatic alcohol such as ethyl, isopropyl, isobutyl or methyl alcohol. Similar acetals may be prepared by halogenating the vinyl acetate and treating the halogenated product with a suitable alcohol.

The process may be conducted by the addition of halogen to vinyl acetate in the presence of the desired alcohol. Thus, if methyl or ethyl or isopropyl acetals are desired, the halogenation may be conducted in the presence of methyl or ethyl or isopropyl alcohol. Similarly, the acetals of other alcohols such as propyl, butyl, isobutyl, amyl. hexyl, lauryl, benzyl, chloro-propyl, chloroethyl, chlorobutyl, bromoethyl, etc., or secondary or tertiary alcohols such as isopropyl alcohol, 2-pentanol, 2-butanol, vinyl methyl carbinol, 1-chloro, 2-propanol, 1,3-dichloro-2 propanol, or tertiary amyl alcohol or tertiary butyl alcohol or unsaturated alcohols such as allyl, methyl allyl, propargyl, crotyl, or cinnamyl alcohol, may be prepared by conducting the halogenation in the presence of the respective alcohol desired.

If desired, the acetals may be prepared by means of a two-stage process wherein the corresponding ester of a 1,2-dihalo alcohol such as an a,b-dihalo ethyl ester may be prepared by halogenation of the vinyl ester and the resulting dihalo ester may be reacted with alcohols to form the corresponding acetal.

More complex acetals may be made from polyhydric alcohols such as ethylene glycol, propylene glycol, isobutylene glycol, trimethylene glycol, hexamethylene glycol or poly glycols including diethylene glycol triethylene glycol, tetraethylene glycol dipropylene glycol, or glycerol, alpha methyl glycerol, etc. The acetals prepared from such polyhydric alcohols are more complex, often being cyclic or polymeric in character. The reaction rate in production of such derivatives may be somewhat slow. However, the reaction mixture may be heated to 70 to 100° C. or above to drive the reaction to completion.

Thus, vinyl acetate may be halogenated to form the corresponding dihalo ethyl acetate and this ester may be reacted with methyl, ethyl, propyl, isopropyl, or other alcohol to form the acetal. This process is preferable where addition of halogen to the alcohol may tend to occur during halogenation of vinyl acetate and is particularly recommended when acetals of unsaturated alcohol are prepared.

If desired, suitable diluents such as chloroform, carbon tetrachloride, benzene, or other inert diluent which may be conveniently separated by distillation from the acetal to be produced may be used. However, the use of diluent generally is unnecessary. Water is evolved in the reaction and accordingly some water is present. This is not objectionable although it is preferred that the reaction mixture be essentially organic.

The halogenation may be conducted at room temperature or above, but in order to improve the yields, however, it is found desirable to avoid the use of temperatures which are undesirably high and in most cases it is found that the yield of acetal is improved by conducting the halogenation at comparatively low temperatures, generally below 10° C., and preferably, below 0° C.

Following the halogenation, it is generally found desirable to allow the reaction mixture to stand in the presence of alcohol for a substantial period of time, generally several hours, in order to permit a more complete reaction to occur and to insure the production of the acetal in high yields. During this period cooling of the mixture is found to be unnecessary and, in general, the mixture is allowed to stand at room temperature. Where the rate of reaction is slow the mixture may be heated in order to increase the rate of reaction.

The acetals may be recovered from the reaction mixtures by convenient methods. In accordance with the present invention, I have secured an effective separation by adding water to the mixture and extracting the acetal layer with a water immiscible solvent such as ether, benzene, chloroform, etc. Following recovery of the ether extract, the extract may be washed with water and/or an aqueous alkaline solution such as a solution of sodium bicarbonate to remove acidic or other water soluble constituents and the solvent removed by distillation. Subsequently, the acetal may be purified by distillation or by other suitable methods.

The following examples are illustrative:

*Example I.*—A solution of 43 g. of dry vinyl acetate in 150 cc. of absolute ethyl alcohol was cooled in a closed cooling bath of dry ice in acetone. Accompanied by stirring, a stream of dry chlorine was passed into the solution until 35.5 g. (½ m.) had been added. The mixture was allowed to warm to room temperature and after standing overnight, the reaction mixture was poured into cold water. The ethyl chloroacetal, which separated, was extracted with ether and the ether solution was washed free of acids. After drying, the solvent was removed and the residual ethyl chloroacetal was distilled. In this manner, ethyl chloroacetal was obtained. This compound ($CH_2ClCH(OC_2H_5)_2$) boiled at 53–54° C. under 16 mm. pressure; $N_D^{20}$ 1.4171; $d_{20}$ 1.017. The process may also be carried out in good yield using 95% ethyl alcohol.

*Example II.*—The process was carried out as in Example I, using 86 g. (1 m.) of vinyl acetate dissolved in 200 cc. of methanol and 71 g. of chlorine. This process resulted in the production of methyl chloroacetal ($CH_2ClCH(OCH_3)_2$) (B. P. 124.5 to 126.5° C. at atmospheric pressure, $N_D^{20}$ 1.4150, $d_{20}$ 1.094).

*Example III.*—Air was passed over the surface of 12.5 cc. of liquid bromine and the bromine laden stream of air was led into a solution of 21.5 g. of vinyl acetate in 75 cc. of absolute ethyl alcohol. During the reaction the mixture was stirred, and the temperature was maintained at minus 10° C. The product of reaction, ethyl bromoacetal, was isolated in the same manner as described for isolating ethyl chloroacetal in Example I.

The above process resulted in a yield of 33 g. or 68% of the theoretical amount of ethyl bromoacetal, B. P. 62–53° C. at 15 mm., $d_{20}$ 1.276; $N_D^{20}$ 1.4395.

*Example IV.*—A solution of 64.5 g. (0.75 moles) of vinyl acetate in 150 cc. (3.7 moles) of methyl alcohol was cooled by immersion in an acetone dry ice cooling bath. To this was added, with stirring, a solution of 120 g. (0.75 mol) of bromine in 100 cc. of $CHCl_3$. The temperature of the reaction mixture remained below −40° C. during the entire reaction. The product of the reaction, methyl bromoacetal, was isolated in the same manner as described for ethyl chloroacetal in Example I, and a yield of 46% of the theoretical of methyl bromoacetal which boiled at 48–51° C. at 18 mm. pressure; $d_{20}$ 1.467; $N_D^{20}$ 1.4475 was obtained.

*Example V.*—86 g. of vinyl acetate was cooled, the temperature to about minus 10 to 20° C. and 72 g. of chlorine was added thereto while the mixture was stirred. The resulting reaction mixture was added dropwise to 250 cc. of absolute ethyl alcohol which was stirred as well as cooled by ice. After standing overnight, the ethyl chloroacetal was isolated as in Example I.

*Example VI.*—43 g. of vinyl acetate was cooled to −5° C. and 80 g. of liquid bromine was added dropwise thereto with stirring. The temperature of the reaction mixture remained at 0° C. or below. The resulting reaction mixture was added to 130 cc. of absolute ethyl alcohol at 0° C. After standing for 2 days, ethyl bromoacetal was isolated as in Example III.

*Example VII.*—Pure 1, 2 dichloroethyl acetate was prepared by fractionally distilling 1, 2 dichloroethyl acetate from the reaction mixture resulting from the halogenation of vinyl acetate. To 157 grams of pure 1, 2 dichloroethyl acetate was added 100 grams of 95% ethyl alcohol. No reaction occurred at room temperature. However upon heating to 64° C. the reaction initiated and the temperature rose to 70° C. and within 15 minutes subsided to 64° C. The haloacetal of ethyl alcohol was recovered as in Example I.

*Example VIII.*—21.5 grams of vinyl acetate was reacted with gaseous chlorine with stirring and cooling by means of a dry ice acetone bath until 18 grams of chlorine was absorbed. The mixture was allowed to warm to room temperature 23 grams of ethylene glycol was added gradually over a period of one hour. The mixture was allowed to stand overnight and thereafter was made alkaline with potassium carbonate solution. The chloroacetal of ethylene glycol was extracted with ether and isolated by distillation of the ether. This product boils at about 150° C. A similar reaction may be effected by use of glycerol in lieu of glycol. Where the reaction of glycol or glycerol is found to be excessively slow the mixture may be heated to 70–100° C. to increase the reaction rate.

*Example IX.*—The process of Example VIII was repeated using triethylene glycol. In this case a viscous polymeric haloacetal of high molecular weight was secured.

*Example X.*—A mixture of 21.5 grams of vinyl acetate and 90 grams of isopropyl alcohol was cooled by a dry ice acetone bath to below 0° C. and chlorine passed into the mixture until 18 grams of chlorine had been added. The mixture was allowed to stand overnight and was neutralized with potassium carbonate solution. The isopropyl haloacetal was recovered by the process of Example I. This process may also be used for the production of chloroacetals of secondary, butyl or secondary amyl alcohol.

*Example XI.*—The process of Example V was repeated using 74 grams of tertiary butyl alcohol in lieu of ethyl alcohol. A small amount of the haloacetal of tertiary butyl alcohol was thus obtained.

Unsaturated acetals may be obtained by substituting an equivalent amount of allyl or methallyl alcohol for ethyl alcohol in the process of Example V. These acetals are liquids which polymerize upon heating to 70–100° C. in the presence of 5 percent by weight of benzoyl peroxide to form substantially insoluble infusible polymers.

Although the present invention has been described with reference to the specific details of certain embodiments thereof, it is not intended that such details shall be regarded as limitations upon the scope of the invention except insofar as included in the accompanying claims.

I claim:

1. A method of preparing a halo acetal which comprises introducing an elemental halogen selected from the group consisting of bromine and chlorine into a mixture of vinyl acetate and an alcohol.

2. A method of preparing a halo acetal which comprises introducing an elemental halogen selected from the group consisting of bromine and chlorine into a mixture of vinyl acetate and an aliphatic alcohol at a temperature not above room temperature.

3. A method of preparing a halo acetal which comprises introducing an elemental halogen selected from the group consisting of bromine and chlorine into an essentially organic mixture of vinyl acetate and an aliphatic alcohol at a temperature not above room temperature.

4. The method of claim 1 in which the alcohol is isopropyl alcohol.

5. The method of claim 1 in which the alcohol is a monohydric secondary alcohol.

6. A method of preparing a halo acetal which comprises reacting an elemental halogen selected from the group consisting of bromine and chlorine with vinyl acetate and reacting the halogenation reaction mixture with an alcohol.

7. A method of preparing a halo acetal which comprises reacting an elemental halogen selected from the group consisting of bromine and chlorine with vinyl acetate adding an aliphatic alcohol to form an essentially organic reaction mixture and permitting the reactants to react.

8. The process of claim 7 wherein the reaction takes place at a temperature not above room temperature.

9. The process of claim 7 in which the alcohol is a monohydric secondary alcohol.

10. The process of claim 7 in which the alcohol is isoprophyl alcohol.

11. The process of preparing a haloacetal which comprises reacting a compound of the group consisting of 1,2 dibromo ethyl acetate and 1,2 dichloro ethyl acetate with an aliphatic alcohol.

12. The process of claim 11 wherein the alcohol is a monohydric aliphatic secondary alcohol.

13. The process of claim 3 wherein the process is conducted in the presence of an inert solvent.

14. The process of preparing a haloacetal which comprises reacting a compound of the group consisting of 1,2 dibromo ethyl acetate and 1,2 dichloro ethyl acetate with a polyhydric aliphatic alcohol.

15. The process of claim 14 wherein the alcohol is ethylene glycol.

16. The process of claim 1 wherein the alcohol is a polyhydric alcohol.

EDWARD M. FILACHIONE.